United States Patent
Jeong

(10) Patent No.: US 9,233,595 B2
(45) Date of Patent: Jan. 12, 2016

(54) METHOD OF CONTROLLING HEATING OF HYBRID ELECTRIC VEHICLE

(71) Applicants: HYUNDAI MOTOR COMPANY, Seoul (KR); KIA MOTORS CORPORATION, Seoul (KR)

(72) Inventor: Won Young Jeong, Suwon-Si (KR)

(73) Assignees: HYUNDAI MOTOR COMPANY, Seoul (KR); KIA MOTORS CORPORATION, Seoul (KR)

( * ) Notice: Subject to any disclaimer, the term of this patent is extended or adjusted under 35 U.S.C. 154(b) by 0 days.

(21) Appl. No.: 14/460,334

(22) Filed: Aug. 14, 2014

(65) Prior Publication Data

US 2015/0174984 A1    Jun. 25, 2015

(30) Foreign Application Priority Data

Dec. 24, 2013  (KR) .................... 10-2013-0162221

(51) Int. Cl.
  B60H 1/03    (2006.01)
  B60H 1/00    (2006.01)
  B60H 1/22    (2006.01)
  F02D 29/02   (2006.01)

(52) U.S. Cl.
  CPC ........... B60H 1/004 (2013.01); B60H 1/2218 (2013.01); B60H 2001/2237 (2013.01); B60H 2001/2253 (2013.01); B60H 2001/2265 (2013.01)

(58) Field of Classification Search
  CPC ............ G60H 1/03; G60H 1/08; G60H 1/00; G60H 1/22; G60H 1/14; B60K 6/485; B60K 6/543; F02D 29/02

USPC .................. 701/22, 36; 165/202; 123/549
See application file for complete search history.

(56) References Cited

U.S. PATENT DOCUMENTS

2009/0000778 A1*  1/2009  Nathan et al. ................. 165/202
2012/0090823 A1*  4/2012  Labaste Mauhe et al. ..... 165/173
2012/0301755 A1   11/2012  Axelsson et al.
2014/0070013 A1*  3/2014  Stanek et al. .................. 237/28

FOREIGN PATENT DOCUMENTS

| JP | 2008-296646 A | 12/2008 |
| JP | 2013-163494 A | 8/2013 |
| KR | 10-2007-0110603 A | 11/2007 |
| KR | 10-2008-0035263 A | 4/2008 |

OTHER PUBLICATIONS

Korean Office Action mailed Nov. 17, 2014 issued in counterpart Korean Patent Application No. 10-2013-0162221; 7 pages (in Korean Language).

* cited by examiner

Primary Examiner — Tan Q Nguyen
(74) Attorney, Agent, or Firm — McDermott Will & Emery LLP

(57) ABSTRACT

A method of controlling heating of a hybrid electric vehicle includes a heating quantity comparing step of comparing an available heating quantity of an auxiliary heater with a necessary heating quantity of the auxiliary heater. A heating efficiency comparing step compares heating efficiency when the auxiliary heater is driven with heating efficiency of a main heater based on driving of an engine when the available heating quantity of the auxiliary heater is greater than the necessary heating quantity of the auxiliary heater. A heating conducting step drives one of the heaters that has a higher heating efficiency.

12 Claims, 1 Drawing Sheet

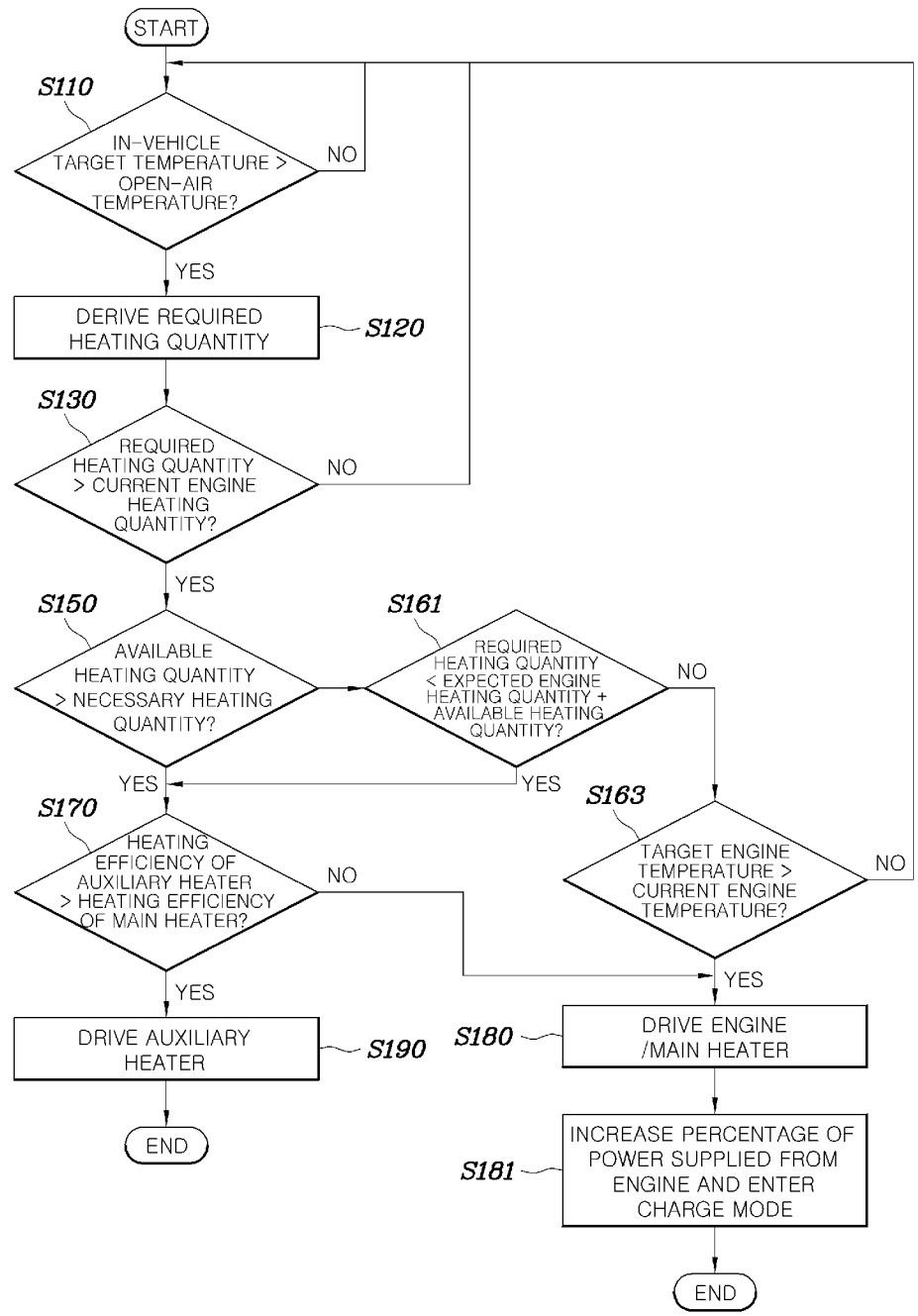

METHOD OF CONTROLLING HEATING OF HYBRID ELECTRIC VEHICLE

CROSS REFERENCE TO RELATED APPLICATION

The present application claims the benefit of priority to Korean Patent Application Number 10-2013-0162221 filed on Dec. 24, 2013, the entire contents of which application are incorporated herein for all purposes by this reference.

TECHNICAL FIELD

The present disclosure relates, in general, to a method of controlling heating of a vehicle and, more particularly, to a method of controlling heating of a hybrid electric vehicle, capable of selectively operating a main heater and an auxiliary heater to increase heating efficiency.

BACKGROUND

Hybrid electric vehicles employ an engine and an electric motor, which is operated by power supplied from a high-voltage battery separately installed on a vehicle, as driving sources for supplying a driving force. The hybrid electric vehicles are designed to realize optimal fuel economy by simultaneously or selectively driving the driving sources according to the circumstances.

The hybrid electric vehicles typically use an electric motor as a main driving source and an engine as an auxiliary driving source. Since an electric motor by nature generates remarkably little heat when driven compared to the engine, the hybrid electric vehicles are designed to conduct in-vehicle heating by driving the engine to heat a coolant of the engine.

In this regard, a "method of controlling a heating system for a hybrid electric vehicle" in Korean Unexamined Patent Application Publication No. 10-2007-0110603 discloses the method of controlling a heating system for a hybrid electric vehicle. Here, the hybrid electric vehicle includes a hybrid system control unit (HCU) controlling energy of the entire vehicle and others, a full automated temperature controller (FATC) controlling a heater to properly maintain an in-vehicle temperature, an engine control unit (ECU) controlling engine driving according to a start/stop instruction from the HCU, and an electric water pump for continuously supplying and circulating an engine coolant to a heater core. The method includes: a first step of collecting information about in-vehicle and open-air temperatures at the FATC and an operation of an engine at the ECU, and checking whether or not a request for heating is input by a user; a second step of determining whether or not the engine needs to be driven for heating on the basis of the information collected in the first step; and a third step of controlling driving of the water pump for heating when it is determined in the second step that the engine needs to be driven.

However, such a related art is designed to separately drive the engine for the purpose of in-vehicle heating. As such, a great deal of fuel is consumed to heat the coolant to a proper temperature, which leads to deterioration of total fuel economy of the vehicle.

The foregoing is intended merely to aid in the understanding of the background of the present disclosure, and is not intended to mean that the present disclosure falls within the purview of the related art that is already known to those skilled in the art.

SUMMARY

The present disclosure has been made keeping in mind the above problems occurring in the related art. The present disclosure provides a method of controlling heating of a hybrid electric vehicle having a main heater using heat from an engine as a main heating source and a separate auxiliary heater, capable of selectively operating the main heater and the auxiliary heater according to specific circumstances so as to realize optimal heating efficiency.

According to an exemplary embodiment of the present disclosure, a method of controlling heating of a hybrid electric vehicle includes a heating quantity comparing step of comparing an available heating quantity of an auxiliary heater with a necessary heating quantity of the auxiliary heater. When the available heating quantity of the auxiliary heater is greater than the necessary heating quantity of the auxiliary heater, a heating efficiency comparing step compares heating efficiency with heating efficiency of a main heater based on driving of an engine when the auxiliary heater is driven. A heating conducting step drives one of the heaters having higher a heating efficiency.

The method may further include a heating condition checking step of comparing an in-vehicle target temperature set by a driver with an open-air temperature of the vehicle.

The method may further include a required heating quantity deriving step of deriving a required heating quantity required for in-vehicle heating according to an in-vehicle target temperature set by a driver.

The required heating quantity deriving step may further include a step of comparing the required heating quantity with a current engine heating quantity that is a heating quantity of the main heater at a current temperature of an engine coolant.

The heating quantity comparing step may be performed when the required heating quantity is greater than the current engine heating quantity.

When the available heating quantity is less than a required heating quantity in the heating quantity comparing step, an expected engine heating quantity that is a heating quantity of the main heater caused by engine heat generated when the vehicle is driven may be calculated, and an available quantity comparing step of comparing the required heating quantity with a sum of the expected engine heating quantity and the available heating quantity may be performed.

The auxiliary heater may be driven when the sum of the expected engine heating quantity and the available heating quantity is greater than the required heating quantity in the available quantity comparing step, and a current engine temperature may be compared with a target engine temperature for reaching the heating quantity required for the main heater when the sum of the expected engine heating quantity and the available heating quantity is less than the required heating quantity in the available quantity comparing step.

The engine may be driven when the current engine temperature is lower than the target engine temperature.

A ratio of power supplied from a motor to power supplied from the engine may be adjusted at normal times in such a manner that a percentage of the power supplied from the engine is increased when the main heater is driven, and a battery may be charged when the engine is in an idle state.

The required heating quantity may be derived by multiplying a value obtained by subtracting an open-air temperature from an in-vehicle target temperature by an in-vehicle volume, air density and air specific heat capacity.

The current engine heating quantity may be derived by multiplying a value obtained by subtracting an open-air temperature from the current temperature of the engine coolant by a coolant volume, coolant density, and coolant specific heat capacity, and the necessary heating quantity may be a difference between the required heating quantity and the current engine heating quantity.

The available heating quantity of the auxiliary heater may be calculated by multiplying a currently remaining amount of a battery and a reference current rate available for heating to calculate a current amount available for the heating from the currently remaining amount, and multiplying the calculated current amount available for heating and a reference heating efficiency of the auxiliary heater.

When the auxiliary heater is driven, the heating efficiency may be calculated by multiplying efficiency of an engine output amount according to a total quantity of heat of fuel used for preset driving of the engine, efficiency of a generated current amount of a generator according to the engine output amount, charging efficiency of the battery according to the generated current amount, and the heating efficiency of the auxiliary heater.

The heating efficiency of the main heater according to the driving of the engine may be obtained by calculating a total quantity of heat of fuel stored in the vehicle, and calculating a quantity of the heat transferred to a coolant from the calculated total quantity of heat.

The quantity of heat transferred to the coolant may be calculated by an expression below.

Quantity of Heat Transferred to Coolant=(Fuel Amount×Fuel Unit Energy−Engine Output Amount−(Exhaust Temperature−Intake Temperature)×Exhaust Air Amount×Exhaust Gas Density×Exhaust Gas Specific Heat Capacity)×Coolant Heat Transfer Rate The expected engine heating quantity may be calculated by multiplying a weighted preset value changed depending on a vehicle speed by a quantity of heat transferred to a coolant.

The auxiliary heater may be a positive temperature coefficient (PTC) heater.

According to the method of controlling heating of a hybrid electric vehicle having the structure as described above, the engine is not always driven for in-vehicle heating, but is selectively driven in comparison with the auxiliary heater in the aspect of efficiency. Thus, it is possible to improve heating efficiency and fuel economy.

Further, the engine and the auxiliary heater that are installed in the vehicle are used without installing a separate unit, so that no additional cost is caused.

BRIEF DESCRIPTION OF THE DRAWINGS

The above and other objects, features and other advantages of the present disclosure will be more clearly understood from the following detailed description when taken in conjunction with the accompanying drawing.

FIG. 1 is a flow chart showing a method of controlling heating of a hybrid electric vehicle according to an embodiment of the present disclosure.

DETAILED DESCRIPTION

Hereinbelow, a method of controlling heating of a hybrid electric vehicle according to an exemplary embodiment of the present disclosure will be described in detail with reference to the accompanying drawings.

FIG. 1 is a flow chart showing a method of controlling heating of a hybrid electric vehicle according to an embodiment of the present disclosure. A method of controlling heating of a hybrid electric vehicle according to an embodiment of the present disclosure includes a heating quantity comparing step of comparing an available heating quantity of an auxiliary heater with a necessary heating quantity of the auxiliary heater (S150). A heating efficiency comparing step compares heating efficiency of the auxiliary heater with heating efficiency of a main heater based on driving of an engine when the available heating quantity of the auxiliary heater is greater than the necessary heating quantity of the auxiliary heater (S170). A heating conducting step drives one of the heaters having a higher heating efficiency (S180, S190).

In detail, the present disclosure may be applied to the hybrid electric vehicle that is driven by an internal combustion engine and an electric motor supplied with power from a battery. The main heater is a heater producing heat from an engine coolant, whereas the auxiliary heater is a positive temperature coefficient (PTC) heater using the battery of the vehicle. As the auxiliary heater, a heat pump, and other heaters may be used in place of the PTC heater. The PCT heater and the heat pump are typically available units, and detailed description thereof will be omitted.

First, when a signal for conducting heating is input from a driver, a heating condition checking step of comparing an in-vehicle target temperature set by the driver with an open-air temperature of the vehicle is performed (S110). When the in-vehicle target temperature is higher than the open-air temperature, it is necessary to drive the main or auxiliary heater to conduct the heating. As such, a required heating quantity deriving step of deriving a required heating quantity required for in-vehicle heating according to the in-vehicle target temperature may be performed (S120).

The required heating quantity is a quantity of heat required for the interior of the vehicle to reach the in-vehicle target temperature, and can be calculated by the following expression.

Required Heating Quantity=(In-Vehicle Target Temperature−Open-Air Temperature)×In-Vehicle Volume×Air Density×Air Specific Heat Capacity    Expression 1

The unit of the required heating quantity is Joule (J) or Kcal, and the specific heat capacity is a quantity of heat required to raise the temperature of 1 kg mass by 1° C. In other words, the required heating quantity is a quantity of heat at a temperature corresponding to a difference between the in-vehicle target temperature and the open-air temperature. The in-vehicle target temperature is a value input by the driver, and the open-air temperature is detected by a temperature sensor. All of the in-vehicle volume, the air density, and the air specific heat capacity are preset values.

After the required heating quantity deriving step S120 is performed, a step of comparing the required heating quantity with a current engine heating quantity given by the main heater at a current temperature of the engine coolant may be further performed (S130). The current engine heating quantity refers to such a quantity of heat that the engine coolant can perform the heating in a state in which the engine is not driven at present. When the current quantity of heat of the coolant is greater than the required heating quantity, the heating can be performed only by the current quantity of heat of the coolant without operating the main or auxiliary heater, and thus improving fuel economy of the vehicle.

The current engine heating quantity can be calculated by the following expression.

Current Engine Heating Quantity=(Current Engine Coolant Temperature−Open-Air Temperature)×Coolant Volume×Coolant Density×Coolant Specific Heat Capacity    Expression 2

The unit of the current engine heating quantity is Joule (J). The current engine coolant temperature and the open-air temperature are detected by sensors. All of the coolant volume, the coolant density, and the coolant specific heat capacity are values preset by an experiment.

When the required heating quantity is greater than the current engine heating quantity, the heating quantity comparing step S150 may be performed. The available heating quantity of the auxiliary heater can be calculated by multiplying a currently remaining amount of the battery and a preset current rate available for the heating (expressed by a percentage (%) of the entire remaining current amount) to calculate a current amount (in unit of Wh) available for heating from the currently remaining amount, and multiplying the calculated current amount available for heating and preset heating efficiency of the auxiliary heater. The unit of heating efficiency of the auxiliary heater is J/Wh, a value of which corresponds to an output quantity of heat according to an input amount of current.

Further, the necessary heating quantity is a differential value between the required heating quantity and the current engine heating quantity, and refers to a quantity of heat obtained by subtracting a quantity of heat with which heating can be currently conducted by the main heater from the quantity of heat required for the in-vehicle heating, i.e. a quantity of heat that is additionally necessary for supply by the driving of the engine or the operation of the auxiliary heater.

The heating quantity comparing step S150 is performed to check whether or not the necessary heating quantity can be satisfied only by the auxiliary heater. In detail, when the available heating quantity of the auxiliary heater is greater than the necessary heating quantity, only the auxiliary heater can be used. If not, an additional heating means needs to be added in addition to the auxiliary heater.

Therefore, when the available heating quantity of the auxiliary heater is greater than the necessary heating quantity, the heating efficiency of the auxiliary heater is compared with that of the main heater according to the engine driving (S170) as described above, and one of the heaters which has the higher heating efficiency may be driven (S180, S190).

The heating efficiency when the auxiliary heater is driven can be calculated by multiplying efficiency of an amount of engine output according to a total quantity of heat of fuel used to drive the engine, efficiency of an amount of generated current of a generator according to the amount of engine output, charging efficiency of the battery according to the amount of generated current, and the heating efficiency of the auxiliary heater. All the factors used for the calculation may be preset by an experiment.

When the auxiliary heater is driven, the engine should be driven to prevent the battery from being discharged. As such, in calculating the heating efficiency when the auxiliary heater is driven, the engine driving and the charging efficiency should be considered.

Further, the heating efficiency of the main heater according to the engine driving can be obtained by calculating the total quantity of heat of the fuel stored in the vehicle, and calculating a quantity of heat transferred to the coolant from the calculated total quantity of heat.

To be more specific, the total quantity of heat can be obtained by multiplying a quantity of heat which the fuel has per liter by an amount (the unit of L) of the fuel stored in the vehicle, and the quantity of heat transferred to the coolant can be obtained by the following expression.

Quantity of Heat Transferred to Coolant=(Fuel Amount×Fuel Unit Energy−Engine Output Amount−(Exhaust Temperature−Intake Temperature)×Exhaust Air Amount×Exhaust Gas Density×Exhaust Gas Specific Heat Capacity)×Coolant Heat Transfer Rate  Expression 3

The fuel amount is an amount (the unit of L) of the fuel stored in the vehicle, and the fuel unit energy is a quantity of heat (the unit of J) per liter of the fuel. The engine output amount is an output amount (the unit of Wh) of an engine driving shaft, and the coolant heat transfer rate is a rate (%) of the quantity of heat that is finally applied to the coolant. The factors of Expression 3 are preset by an experiment corresponding to the amount of fuel stored in the vehicle. Accordingly, among the quantity of heat which is left by excluding a quantity of heat consumed by rotation of the driving shaft and a quantity of heat used to heat the exhaust gas during combustion from the overall input quantity of heat, only the quantity of heat corresponding to the coolant heat transfer rate is estimated as that transferred to the coolant.

When the available heating quantity is less than the required heating quantity in the heating quantity comparing step S150, an expected engine heating quantity that is a heating quantity of the main heater caused by engine heat generated during the driving of the vehicle is calculated, and an available quantity comparing step of comparing the required heating quantity with the sum of the expected engine heating quantity and the available heating quantity may be performed (S161).

The expected engine heating quantity is not required to drive the engine to conduct heating, but is expected in the future by the driving and cutting of the engine so as to be able to be supplied by the main heater.

The expected engine heating quantity can be obtained by multiplying a preset weighted value changed depending on a vehicle speed by the quantity of heat transferred to the coolant. The weighted value is multiplied because when an engine driving force is used during the driving of the engine, heat generated at a high speed is more than that generated at a low speed, and even when the same amount of fuel is used, a rate converted into heat at the high speed is higher than that converted into heat at the low speed. Since the overall quantity of heat transferred to the coolant uses the present value as the calculation element, a quantity of heat that is more than the quantity of heat transferred to the coolant may be transferred to the coolant depending on the vehicle speed. The weighted value accompanied by the transferring is set to expect a quantity of heat which the coolant may have.

Therefore, an average vehicle speed from the point of time at which the vehicle begins to be driven to a current point of time is obtained. A preset weighted value corresponding to the average vehicle speed is multiplied by the quantity of heat transferred to the coolant. Thereby, the heating quantity of the main heater, which is generated by driving the vehicle, can be obtained. The average vehicle speed is obtained because it is assumed that the vehicle will continue to be driven at the average vehicle speed in the future.

As such, when the sum of the expected engine heating quantity and the available heating quantity is greater than the required heating quantity in the available quantity comparing step S161, the available heating quantity can be sufficiently obtained only by adding the heating quantity obtained by driving the auxiliary heater to the heating quantity of the main heater which is expected in a state in which the engine is not intentionally driven for heating. As such, the auxiliary heater may be driven (S190).

In contrast, when the sum of the expected engine heating quantity and the available heating quantity is less than the required heating quantity in the available quantity comparing step S161, the available heating quantity cannot be obtained even by adding the heating quantity of the auxiliary heater to the heating quantity of the main heater in the state in which the engine is not driven for heating. As such, the engine and the main heater may be driven (S180) so as to conduct only the heating caused by the main heater. This is because, even when the auxiliary heater is driven, the available heating quantity cannot be obtained, and the main heater should be inevitably driven to fill the shortage. In this case, since the heating quantity of the main heater may be greater than that of the auxiliary heater depending on an amount of burnt fuel, only the main heater is driven to cut power consumption of the battery and to effectively conduct heating.

Further, before the main heater is driven (S180), a current engine temperature and a target engine temperature may be compared (S163). If the current engine temperature is higher than the target engine temperature for reaching the heating quantity required for the main heater, it is unnecessary to deliberately drive the engine for heating. In this case, when the current engine temperature is lower than the target engine temperature, the engine may be forced to be driven (S180).

A time for which the engine supplies power to the vehicle may be increased when the main heater is driven, and the battery may be charged when the engine is in an idle state (S181).

In other words, when it is determined that it is necessary to drive the main heater, the driving force generated when the engine is driven for heating may be used as the power of the vehicle rather than dissipated from the viewpoint of improving the fuel economy. As such, when the engine is driven for heating, a ratio of power supplied from the motor to power supplied from the engine at normal times is adjusted in such a manner that a percentage of the power supplied from the engine is increased, thereby the power supplied from the engine can be effectively used. For example, it is assumed that, when the vehicle moves on an uphill road, the driving force is supplied to the motor and the engine at a ratio of 50:50 at normal times. When it is determined that it is necessary to drive the main heater, the ratio of power supplied from the motor to power supplied from the engine is changed into 40:60 or 30:70. Alternatively, the time to drive the engine may be increased.

Further, to conduct heating when the vehicle is parked, the engine is driven in an idle state. In this case, the battery is charged, and thereby, the driving force of the engine can be effectively used without being dissipated.

According to the method of controlling heating of a hybrid electric vehicle having the structure as described above, the engine is not always driven when in-vehicle heating is conducted, but is selectively driven by an efficiency comparison with the auxiliary heater, so that it is possible to improve the heating efficiency and the fuel economy of the vehicle.

Further, a separate unit is not added, but the engine and auxiliary heater installed in the vehicle are used. As such, no additional cost is generated.

Although an exemplary embodiment of the present disclosure has been described for illustrative purposes, those skilled in the art will appreciate that various modifications, additions and substitutions are possible, without departing from the scope and spirit of the disclosure as disclosed in the accompanying claims.

What is claimed is:

1. A method of controlling heating of a hybrid electric vehicle, the method comprising:
    a required heating quantity deriving step of deriving a required heating quantity required for in-vehicle heating according to an in-vehicle target temperature set by a driver;
    a heating quantity comparing step of comparing an available heating quantity of an auxiliary heater with a necessary heating quantity of the auxiliary heater;
    a heating efficiency comparing step of comparing heating efficiency of the auxiliary heater when the auxiliary heater is driven with heating efficiency of a main heater based on driving of an engine when the available heating quantity of the auxiliary heater is greater than the necessary heating quantity of the auxiliary heater; and
    a heating conducting step of driving one of the heaters having a higher heating efficiency,
    wherein the available heating quantity of the auxiliary heater is calculated by multiplying a currently remaining amount of a battery and a preset current rate available for heating to calculate a current amount available for heating from the currently remaining amount, and multiplying the calculated current amount available for heating and a reference heating efficiency of the auxiliary heater, and the necessary heating quantity of the auxiliary heater is calculated by subtracting a heating quantity of the main heater from the required heating quantity required for the in-vehicle heating,
    wherein the required heating quantity deriving step further includes a step of deriving the necessary heating quantity of the auxiliary heater by comparing the required heating quantity with a current engine heating quantity that is the heating quantity of the main heater at a current temperature of an engine coolant,
    wherein, when the auxiliary heater is driven, the heating efficiency of the auxiliary heater is calculated by multiplying efficiency of an engine output amount according to a total quantity of heat of fuel used for preset driving of the engine, efficiency of a generated current amount of a generator according to the engine output amount, charging battery according to the generated current amount, and the heating efficiency of the auxiliary heater, and
    wherein the heating efficiency of the main heater according to the driving of the engine is obtained by calculating a total quantity of heat of fuel stored in the vehicle, and calculating a quantity of heat transferred to a coolant from the calculated total quantity of heat.

2. The method according to claim 1, further comprising a heating condition checking step of comparing the in-vehicle target temperature with an open-air temperature of the vehicle.

3. The method according to claim 1, wherein the step of deriving the necessary heating quantity of the auxiliary is performed when the required heating quantity is greater than the current engine heating quantity.

4. The method according to claim 1, wherein, when the available heating quantity is less than the required heating quantity, an expected engine heating quantity that is a heating quantity of the main heater caused by engine heat generated when the vehicle is driven is calculated, and an available quantity comparing step of comparing the required heating quantity with a sum of the expected engine heating quantity and the available heating quantity is performed.

5. The method according to claim 4, wherein the auxiliary heater is driven when the sum of the expected engine heating quantity and the available heating quantity is greater than the required heating quantity in the available quantity comparing step, and a current engine temperature is compared with a target engine temperature for reaching the heating quantity required for the main heater when the sum of the expected engine heating quantity and the available heating quantity is less than the required heating quantity in the available quantity comparing step.

6. The method according to claim 5, wherein the engine is driven when the current engine temperature is lower than the target engine temperature.

7. The method according to claim 4, wherein the expected engine heating quantity is calculated by multiplying a weighted reference value changed depending on a vehicle speed by a quantity of heat transferred to a coolant.

8. The method according to claim 1, wherein a ratio of power supplied from a motor to power supplied from the engine is adjusted in such a manner that a percentage of the power supplied from the engine is increased when the main heater is driven, and a battery is charged when the engine is in an idle state.

9. The method according to claim 1, wherein the required heating quantity is derived by multiplying a value obtained by subtracting an open-air temperature from an in-vehicle target temperature by an in-vehicle volume, air density, and air specific heat capacity.

10. The method according to claim 1, wherein the current engine heating quantity is derived by multiplying a value obtained by subtracting an open-air temperature from the current temperature of the engine coolant by a coolant volume, coolant density, and coolant specific heat capacity, and the necessary heating quantity is a difference between the required heating quantity and the current engine heating quantity.

11. The method according to claim 1, wherein the quantity of the heat transferred to the coolant is calculated by an expression below:

Quantity of Heat Transferred to Coolant=(Fuel Amount×Fuel Unit Energy−Engine Output Amount−(Exhaust Temperature−Intake Temperature)×Exhaust Air Amount×Exhaust Gas Density×Exhaust Gas Specific Heat Capacity)×Coolant Heat Transfer Rate.

12. The method according to claim 1, wherein the auxiliary heater is a positive temperature coefficient (PTC) heater.

* * * * *